United States Patent [19]

Schechter

[11] 4,374,511
[45] Feb. 22, 1983

[54] FUEL INJECTION PUMP WITH DISTRIBUTOR TYPE FUEL CONTROL

[75] Inventor: Michael M. Schechter, Southfield, Mich.

[73] Assignee: Ford Motor Company, Dearborn, Mich.

[21] Appl. No.: 219,108

[22] Filed: Dec. 22, 1980

[51] Int. Cl.³ .................................................. F02M 39/00
[52] U.S. Cl. ........................................ 123/448; 123/504
[58] Field of Search ............... 123/448, 499, 497, 495, 123/504

[56] References Cited

U.S. PATENT DOCUMENTS

| | | | |
|---|---|---|---|
| 1,664,610 | 4/1928 | French | 123/448 |
| 2,223,757 | 12/1940 | Dillstrom | 123/495 |
| 2,884,919 | 5/1959 | Butler | 123/495 |
| 3,077,872 | 2/1963 | Allen | 123/448 |
| 3,851,635 | 12/1974 | Murtin et al. | 123/448 |
| 4,229,148 | 10/1980 | Richmond et al. | 123/495 |
| 4,295,453 | 10/1981 | Seilly et al. | 123/499 |

Primary Examiner—Ira S. Lazarus
Assistant Examiner—Magdalen Moy
Attorney, Agent, or Firm—Robert E. McCollum; Clifford L. Sadler

[57] ABSTRACT

A fuel injection pump has a single plunger either electromagnetically or hydraulically actuated for flow of fuel into a fuel distribution chamber from which the fuel is distributed individually to each engine cylinder past a series of small solenoid controlled outlet valves actuated one at a time in sequence with the engine firing order.

9 Claims, 6 Drawing Figures

FUEL INJECTION PUMP WITH DISTRIBUTOR TYPE FUEL CONTROL

This invention relates in general to an automotive type fuel injection pump. More particularly, it relates to one that is low in cost and weight, and is simple in construction, while providing good fuel delivery control and cylinder-to-cylinder fuel distribution.

This invention is an improvement of the pump shown and described in my U.S. Pat. No. 4,300,509 which shows unit fuel injector assemblies in which a separate fuel pump is provided for each engine cylinder.

The pump of this invention in its preferred form is of the plunger type with a single pumping plunger a single fuel delivery control valve to satisfy all of the fuel requirements of all of the engine cylinders. The plunger is located on the axis of the pump and in an end-to-end relationship with the delivery valve. A fuel distribution chamber is located downstream of the delivery valve and connected by separate fuel injection lines to each engine cylinder past a series of solenoid controlled fuel outlet valves that are arranged in a circular pattern around the plunger to form a compact, simplified pump construction. Each of the solenoid controlled valves is operated individually and in succession in accordance with the firing order of the engine so that during each pumping stroke of the plunger, fuel will be directed into a different engine cylinder in accordance with the firing order schedule. When the pumping plunger retracts on its intake stroke, the delivery valve will retract to reduce the injection line residual pressure. The solenoid previously energized then will be deenergized and the next solenoid in succession energized so that when the pump again moves through its pumping stroke, fuel will be injected past the next successively opened solenoid controlled outlet valve.

The plunger in one embodiment is movable by a main solenoid controlled by an onboard computer, microprocessor, or similar electrical control that reacts to changing engine operating conditions to control the voltage impulses to the main solenoid to be of a duration and magnitude to define the stroke of the plunger to agree with a predetermined schedule.

Another embodiment of the invention moves the plunger by means of a high pressure actuating fluid that is operatively connected to the plunger by an on/off valve controlled electrically again by an onboard computer/microprocessor, or other suitable electrical control, to vary the duration and magnitude of the pressure acting on the plunger to control the plunger stroke in accordance with the predetermined schedule.

It is an object of the invention, therefore, to provide a compact fuel injection pump of a simplified construction with a single pumping element combined with a rotary fuel distributor and a fuel delivery control valve to assure selective delivery of fuel from the plunger to each of the engine cylinders in a predetermined order corresponding to the engine firing order and with equal quantities of fuel to all the cylinders to assure uniform engine cylinder-to-cylinder fuel distribution.

It is another object of the invention to provide a pump of the type described which in one embodiment is actuated by a main solenoid whose voltage impulses are controlled to provide a desired duration and magnitude of fuel pumped in accordance with a predetermined schedule, and in another embodiment is actuated by high pressure fluid again controlled in pressure level to control the stroke of the plunger in a predetermined manner to agree with the predetermined fuel schedule, a feedback sensing device being provided in both embodiments to permit correction to be made to the fuel flow to each of the engine cylinders in the event the actual plunger stroke does not provide an output fuel volume that matches the flow called for in accordance with the predetermined schedule.

Other objects, features and advantages of the invention will become more apparent upon reference to the succeeding detailed description thereof, and to the drawings illustrating the preferred embodiments thereof; wherein, FIG. 1 is a cross-sectional view of one embodiment of a fuel injection pump constructed according to the invention;

Figure 1:
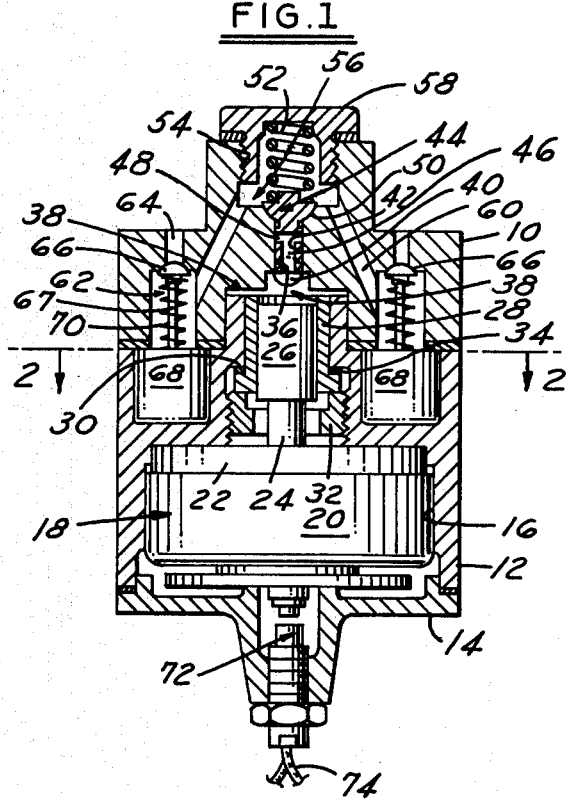

FIG. 1 shows a fuel injection pump having a housing consisting essentially of three parts, an upper part 10, a main body portion 12, and a lower cover portion 14, all secured together by suitable means, not shown. The main body portion 12 has a large stepped diameter central cavity 16 in which is mounted a main power solenoid 18 having a stationary casing 20. The movable armature 22 of the solenoid projects axially from both ends of case 20 and is secured to the stem 24 of a pumping plunger 26. Plunger 26 is reciprocably mounted for sliding within a stationary sleeve 28 located against a shoulder 30 in main body portion 12 by a nut 32. A copper gasket 34 between the sleeve and main body is crushable upon takeup of the nut 32 to seal against the leakage of fuel between the sleeve and main body.

Upper housing portion 10 similarly contains a stepped diameter bore 36 for receiving projecting portions of the main body 12 and the ends of sleeve 28. Portion 10 also defines a fuel chamber 38 having a fuel inlet 40. The latter would contain a one-way check valve, not shown, and is adapted to be connected to any suitable source of fuel under relatively low pressure, 28–30 psi, for example. The pressure level would be sufficient to move plunger 26 downwardly when the solenoid is deenergized until stopped by a mechanical stop, not shown.

The reduced diameter portion 42 of bore 36 contains a conventional retraction type delivery valve 44 having a lower fuel bore 46 intersected by cross-bores 48. The upper terminal portion contains a conically shaped head 50 adapted to seat against a mating portion of the upper housing 10 to block flow of fuel from chamber 38 past the valve. A light spring 52 maintains the valve seated in the position shown in the absence of a buildup of fuel pressure in chamber 38 to a level above the force of spring 52. A recess 54 in the upper part of housing 10 defines a fuel distribution chamber 56 closed by a cap 58 threadably mounted to the housing. The cap further constitutes a seat for the spring 52.

Figure 2:
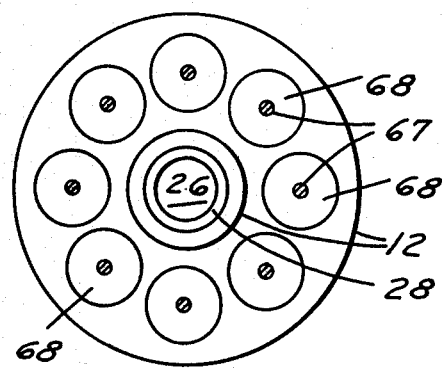
FIG. 2 is a cross-sectional view taken on a plane indicated by and viewed in the direction of the arrows 2—2 of FIG. 1.

Referring now to both FIGS. 1 and 2, the fuel distribution chamber 56 is connected by eight fuel outlet lines 60 to an equal number of solenoid controlled valve fuel chambers 62 formed in outlet housing portion 10. Each of the chambers 62 is connected by an outlet line or passage 64 to a conventional fuel injector, not shown, located for delivery of fuel into each individual engine cylinder, also not shown. In this case, each outlet 64 is controlled by an outlet valve 66 that is connected to or integral with the armature 67 of a distributor solenoid 68. As will be described later, each of the distributor solenoids is adapted to be actuated individually and in a particular sequence in accordance with the engine firing order to provide fuel to each of the engine cylinders at a predescribed time in accordance with a predetermined schedule. Normally, fuel pressure in chamber 62 will maintain the outlet valve 66 closed when the solenoid 66 is deenergized. However, a light spring 70 may also be provided to assure seating of the valve at this time.

Completing the construction, the lower cost portion 14 contains a proximity sensor or position sensor 72 that is electrically connected by wiring 74 to an onboard type computer, microprocessor, or other suitable electrical control, not shown. The latter would be connected to various portions of the engine to receive input signals therefrom indicating various operating conditions of the engine. The signals then would be converted into an output voltage impulse that is supplied to the main solenoid 18 for actuating the plunger 26 through its pumping stroke and a simultaneous impulse to an individual solenoid 68 so as to open only one outlet valve 66 at a time and in succession with the others so as to provide individual injection of fuel into only one cylinder at a time.

More specifically, the pumping action of plunger 26 is caused and controlled by a magnetic force generated in the main solenoid 18. The quantity of fuel displaced by plunger 26 will be determined by the magnitude and duration of the current pulse to solenoid 18, while the timing of the injection will be defined by the timing of the pulse. Energizing the solenoid 18 will drive the plunger 26 upwardly, thus pressurizing the fuel and pumping it past the opened delivery valve 44. The fuel will then flow past one of the solenoid controlled outlet valves 66 into the injection line or passage 64 connecting the pump with that particular fuel injector in the engine cylinder. When the main solenoid 18 is deenergized, fuel pressure in the inlet 40 will stop the pumping movement of the plunger 26 and injection will be terminated. This is occasioned by a drop in the fuel pressure allowing the retraction valve spring 52 to move the retraction valve 44 downwardly until it initially cuts off communication of fuel between the distribution chamber 56 and the fuel chamber 38. A further drop in fuel pressure in chamber 38 allows the retraction valve to move into the bore 42 thereby retracting a predetermined mass of the valve out of chamber 56 and reducing the residual pressure in the lines 60. During the return stroke of pump plunger 26, the previously opened outlet valve 66 will be closed down and another valve in sequence opened so that during the next pumping stroke the fuel will be delivered to another cylinder. In a four-stroke engine, the number of plunger pumping strokes per crankshaft revolution would equal one-half the number of cylinders.

A return spring or even a return solenoid may be incorporated if desired to provide a positive return of the plunger 26 to its lower retracted position, if the supply pressure in inlet 40 does not insure sufficiently fast return. During this return movement, the one-way check valve in the fuel line to inlet 40 will open, to fill the bore 36 with fuel.

As stated previously, the pump is intended to serve all cylinders of a multi-cylinder engine, although in some cases, two pumps per engine could be used, if desired. As has been described, this is accomplished by means of the fuel distributor, which during each pumping stroke connects the fuel from the plunger barrel to a different cylinder, thus fueling all of the cylinders in a sequence determined by the engine firing order.

The onboard computer previously referred to would continuously monitor the operation of the engine and determine the required fuel delivery and injection timing and direct current impulses to the main solenoid 18 to be of such materials and duration and with such timing as needed to produce the required stroke of the plunger at the required instant to match the predetermined engine design schedule. In order to accomplish this, the plunger position sensor 72 will feedback signals into the computer permitting the latter to evaluate the actual plunger stroke, compare it with the desire one, and modify, if necessary, the current impulse sent to the main solenoid 18 until the actual plunger stroke matches the required one. Since the same plunger, delivery valve, and position sensor are used to pump and meter the fuel into all of the cylinders, the probability of equal cylinder-to-cylinder fuel distribution is inherently higher than in the case of a multi-plunger fuel injection pump.

Figure 3:
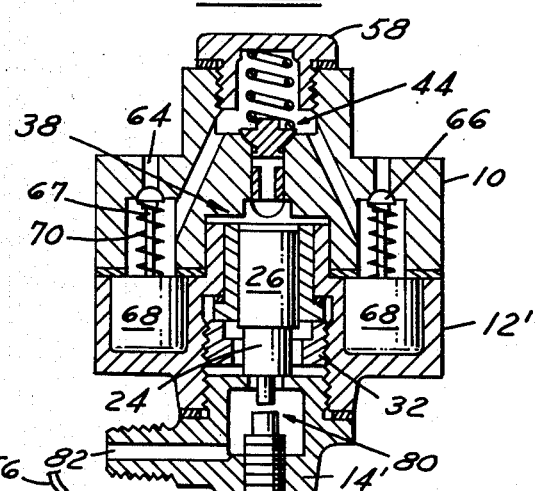
FIGS. 3 and 4 are cross-sectional views of pumps similar to that of FIG. 1 and illustrating other embodiments of the invention.
Figure 5:
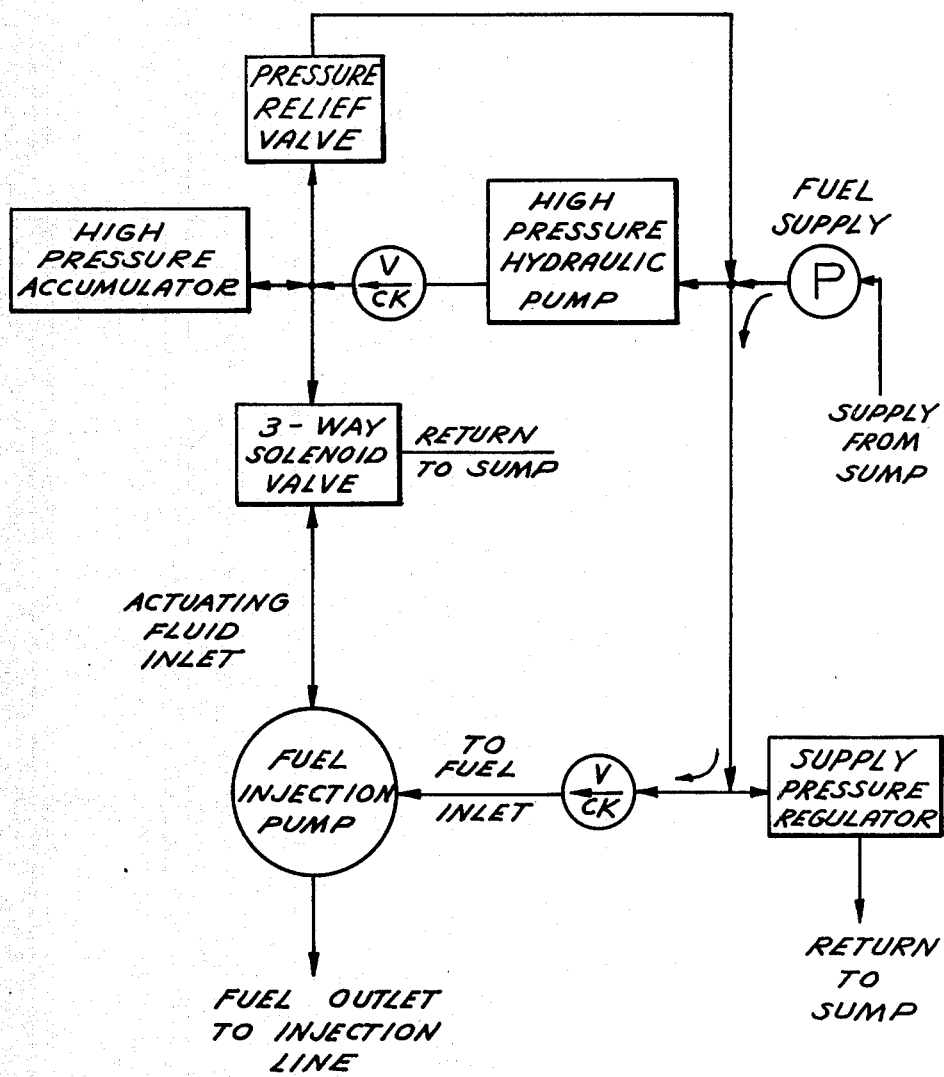
FIG. 5 is a schematic line diagram representative of a fuel control system for the embodiment of the pump shown in FIG. 3; and, FIG. 6 is a line diagram type representation of a feedback control system for the pump embodiments illustrated in FIGS. 1 and 3.

FIG. 3 shows another embodiment of the invention. In this case, the pump plunger 26 is actuated not by a main solenoid 18, as shown in FIG. 1, but by a high pressure fluid selectively applied to the bottom of the plunger to control the magnitude and duration of the plunger stroke in the desired manner. More specifically, the pump housing upper portion 10 and upper portion of the main body 12 remain essentially the same in construction and operation as previously described in connection with FIG. 1. However, the lower main body portion 12' and the lower cover portion 14' have been modified to include a lower actuating chamber 80. In this case, the actuating fluid is supplied to chamber 80 through an inlet 82 from a high pressure hydraulic system. This system, as seen in FIG. 5, is controlled by a three-way solenoid valve controlling the supply of high pressure fluid. Thus, the quantity of fuel displaced by plunger 26 will be determined by the duration of the current pulse to the coil of the three-way solenoid, while the timing of the injection will be defined by the timing of the pulse. As a result, the operation of this embodiment of this invention is essentially the same as that described in connection with FIG. 1, except for the particular method of actuating plunger 26. Both actuators of the FIGS. 1 and 3 embodiments are controlled in duration and magnitude of force by controlling the voltage impulses to a solenoid.

Various hydraulic fluids could be used for the plunger actuation in FIG. 3, but using engine fuel offers one of the simplest solutions. FIG. 5 is a self-explanatory diagrammatic representation of a hydraulic system that would be suitable for use in this embodiment. More specifically, a fuel supply pump would delivery fuel under a moderate supply pressure through a check valve and the fuel inlet 40 to the pumping chamber 38 of the fuel injection pump. The same supply pump would deliver fuel also to a high pressure hydraulic pump that would pump it through a check valve into a high pressure common fuel system including an accumulator. A pressure relief valve would prevent excessive pressure buildup. Energizing the solenoid of the three-way solenoid valve indicated in FIG. 5 would connect the actuating chamber 80 of the fuel injection pump with the high pressure hydraulic system. The deenergizing of the solenoid would then connect actuating chamber 80 with the return or vent to sump.

Figure 6:
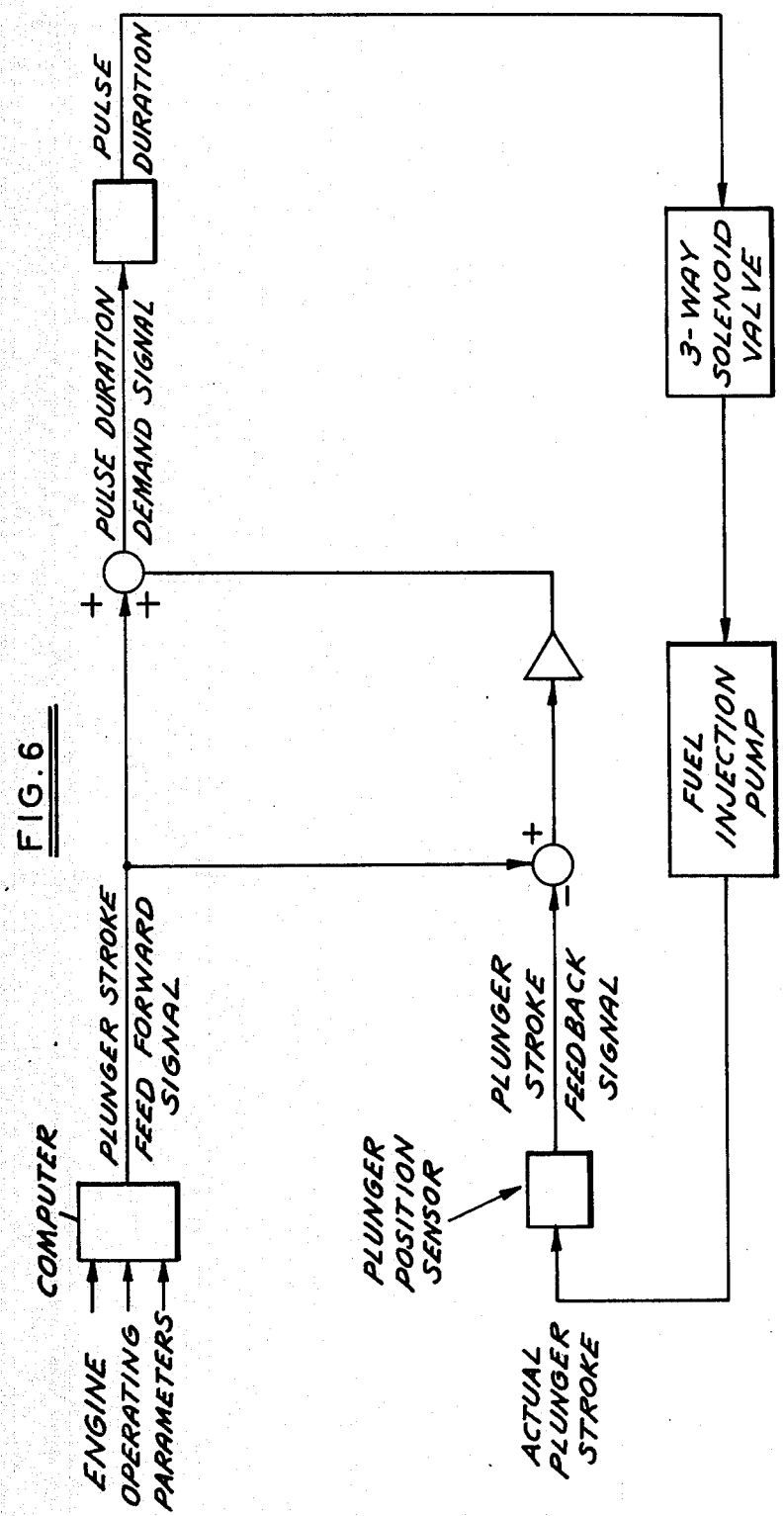

FIG. 6 is a simplified block diagram of a closed loop plunger stroke control system for use with the embodiment shown in FIG. 3, and, with slight modification, for use with the embodiment also shown in FIG. 1. In this case, various engine sensors develop input signals to the onboard computer or microprocessor or electrical control, as the case may be. These signals are then converted into a plunger stroke feedforward signal in accordance with a predetermined design schedule to provide a predetermined voltage impulse to the solenoid 18 shown in FIG. 1 or to the solenoid of the three-way valve indicated in FIG. 5. The movement of the pump plunger 26 is then indicated by the proximity sensor, which supplies a feedback signal to the computer where it is compared with the feedforward signal for error. If such an error exists, plus or minus, a correction is made in the pulse duration and magnitude of the voltage to the solenoids, which thereby changes the stroke of the plunger 26 until the output of the plunger agrees with the schedule as called for by the computer. Obviously, other types of control systems could be used without departing from the scope of the invention.

Figure 4:
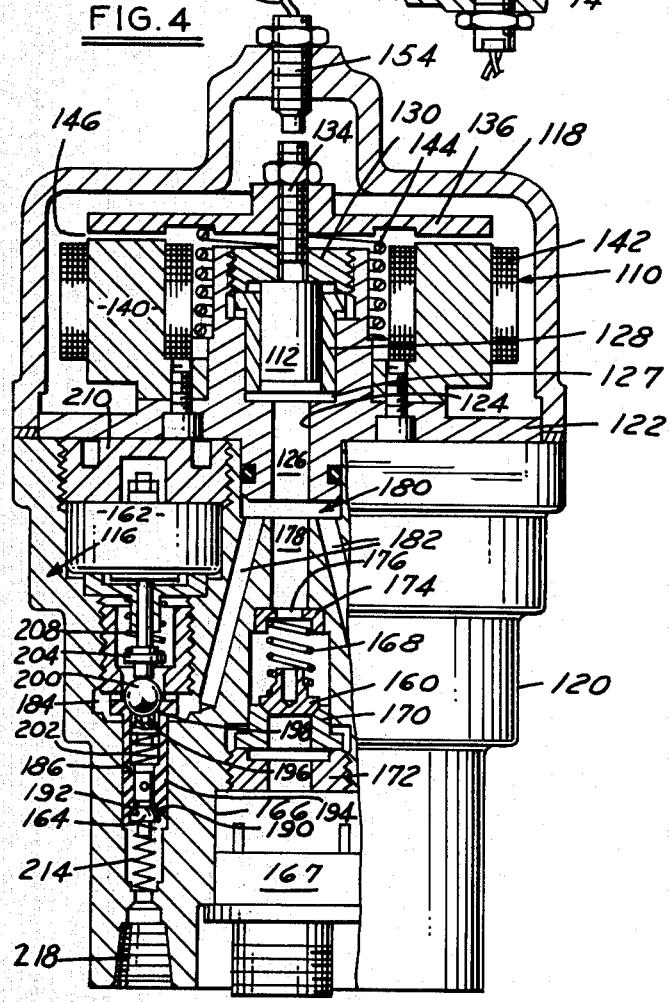

FIG. 4 shows still another embodiment. The FIGS. 1 and 3 embodiments utilized a single delivery valve and eight individual solenoid controlled outlet valves. The embodiments of FIG. 4 provides a similar operation using one pump plunger, but utilizes an inlet check valve and eight individual fuel delivery valves controlled by eight solenoid controlled outlet valves.

More particularly, the fuel injection pump shown in FIG. 4 consists essentially of three parts, namely, a main solenoid assembly 110 for driving a pumping plunger 112 and a solenoid actuated fuel distributor unit 116. The three above-named units are arranged in a compact manner within a housing consisting essentially of upper and lower parts 118 and 120. Secured within upper housing portion 118 is a main pump casing 122 having a stepped diameter bore 124. The smallest diameter portion of the bore constitutes a fuel inlet 126 to a larger bore portion 127 within which a sleeve 128 is located by a stop nut 130. Reciprocably slideable within sleeve 128 is the pumping plunger 112 having an extended stem portion 134. The latter is threadably engaged with the large annular armature 136 of the main solenoid assembly 110. The latter includes a stationary annular core 140 that is screwed to pump casing 122, as shown. The core surrounds pump plunger 112 and is spaced radially therefrom, with suitable coils 142 being wound around the core as shown. The armature 137 is biased by a spring 144 away from core 140 to provide the conventional gap 146 between the two.

The upper housing portion 118 contains a position sensor 154, such as a proximity sensor, connected by wiring 156 electrically to the microprocessor or similar device referred to in connection with the other embodiments. The sensor would establish a feedback signal indicative of the position of the plunger 112 similar to that of the FIGS. 1 and 3 embodiments.

The solenoid controlled fuel distributing assembly 116 contained in lower housing portion 120 consists in general of an inlet check valve 160, and a number of small solenoids 162 each controlling fuel flow past fuel delivery valves 164 to individual engine cylinder fuel injectors, not shown. The solenoids would be clustered in a circular pattern around the axis of the pump and equally spaced circumferentially from one another.

More particularly, housing 120 has a stepped diameter central bore 166 that constitutes a fuel inlet from a source of fuel under a low pressure, not shown. The larger diameter portion of the bore also constitutes a recess 167 for reception of an electrical harness that provides the electrical connection to the main solenoid assembly 110 and the cluster of small individual solenoids 162 to be described. The bore 166 also contains the one-way check valve 160 seatable by a spring 168 against a mating portion of the sleeve member 170. The latter is located against a shoulder of the bore by a stop nut 172. A second sleeve 174 containing an orifice 176 connects fuel to a passage 178 that opens into a fuel distribution chamber 180. The latter also is connected to passage 126. Chamber 180 in turn is connected by a number of spoke-like passages 182 to a fuel annulus 184.

The lower housing portion 120 contains a number of secondary stepped diameter bores 186 corresponding in number to the number of engine cylinders and the number of fuel injectors required for the engine. More particularly, the lower portion of each bore contains a fuel delivery valve 164 of the retraction type having a conical surface 190 adapted to seat against a mating surface 192 on a sleeve type valve body 194. Within the valve body adjacent delivery valve 164 is a slideable sleeve 196 having a spherically formed end portion 198 cooperating with a ball valve member 200. The ball valve when seated as shown blocks the passage of fuel from the annulus 184 through sleeve 196 to the delivery valve 164. Sleeve 196 is biased against ball valve 200 by light spring 202.

Ball valve 200 is maintained in its closed position by the plunger-like armature 204 of the small solenoid 162 threadably mounted into housing portion 120. The plunger, in this case, is biased by a spring 208 against ball valve 200 to maintain it seated as shown. A large nut 210 locates the sleeve-type valve body 194 in position.

In operation, again, fuel is scheduled to be delivered to only one engine cylinder at a time so as to coincide with the firing order of the engine. As a result, only one of the small solenoids 162 will be energized at any one particular time, and in a particular sequence, to retract the plunger-armature 204. This will permit spring 202 to move sleeve 196 and ball valve 200 upwardly to permit entry of fuel from the annulus 184 to the delivery valve 164. When the main solenoid 110 is energized, therefore, retraction of the armature 136 downwardly will cause a downward movement of plunger 112 through a pumping stroke to pressurize the fuel in passage 126 and distribution chamber 180 that previously has been filled by a flow of supply fuel past the check valve 160. At substantially the same time, the microprocessor unit, not shown, will activate one of the smaller solenoids 162 to retract the plunger-armature 204 and permit the ball valve 200 to move upwardly to an open position. This will allow the fuel under pressure in the distribution chamber 180 to flow through the passages 182 to the annulus 184 and past the open ball valve 200 to the delivery valve 164. As soon as the force of the spring 214 of the delivery valve is overcome, the delivery valve will move downwardly out of the valve body 194 until the intersecting supply passages of the valve permit a free flow of fuel into the injector passage 218.

The duration and magnitude of fuel injected during each operation will vary as a function of the current impulses to each small solenoid 162 and to the main solenoid 110, as in previous embodiments.

Therefore, when fuel injection is terminated by termination of voltage to the solenoids 162, the residual pressure in the injector line 218 will drop. When it is below the level of the force of spring 214, the delivery valve 164 will begin to move upwardly into the bore of the valve body 194. Once the delivery valve has retracted, deenergization of the particular solenoid 162 activated at that time will cause or permit the spring 208 to move the plunger-armature 204 and ball valve 200 to its lower position seated against the valve body 194 and thereby block off communication of fuel between the annulus 184 and the injector line 218. Injection is now terminated. Simultaneously, the main solenoid return spring 144 will cause the armature 136 to move upwardly to return the plunger 112 to its intake position shown. This latter movement will also cause an unseating of the intake check valve 160 and permit a fresh supply of fuel to flow into the passages and distribution chamber 180 for injection on the next stroke of the plunger 112.

While the invention has been shown and described in its preferred embodiments, it will be clear to those skilled in the arts to which it pertains that many changes and modifications may be made thereto without departing from the scope of the invention.

I claim:

1. An automotive type internal combustion engine fuel injection pump including a housing having a central bore, a plunger reciprocably movable within the bore adjacent one end, a spring closed delivery control valve normally blocking the other end of the bore, a source of supply fuel under a first low pressure connected to the bore space between the plunger and valve for filling the space upon movement of the plunger away from the valve in a fuel intake stroke and for pressurization of the fuel to a level above the delivery valve spring force upon movement of the plunger towards the valve in a pumping stroke, a plurality of fuel outlet lines corresponding in number to the number of engine cylinders connected at one end to the bore downstream of the valve and connected at their other ends each to a separate engine cylinder, each of the outlet lines containing a fuel outlet valve normally closed to block fuel flow to the cylinders, each of the outlet valves having a solenoid connected thereto for moving the outlet valve to an open position upon energization of its solenoid, the solenoids being selectively energized one at a time to assure the injection of fuel into each cylinder on a one at a time schedule, force means to reciprocate the plunger, and stroke control means to variably control the stroke of the plunger to vary the duration and magnitude of injection of fuel to each of the outlet lines, the force means comprising a main solenoid having an armature connected to the plunger, the control means including electrical means to vary the voltage impulses to the main solenoid as a function of varying engine operating conditions to vary the duration and magnitude of pumping fuel by the plunger to agree with a predetermined schedule, the control means also energizing the fuel outlet line solenoids in sequence one at a time while deenergizing the remaining fuel outlet line solenoids to connect the output from the plunger past a different outlet valve upon each successive pumping stroke of the plunger.

2. An automotive type internal combustion engine fuel injection pump including a housing having a central bore, a plunger reciprocably movable within the bore adjacent one end, a spring closed delivery control valve normally blocking the other end of the bore, a source of supply fuel under a first low pressure connected to the bore space between the plunger and valve for filling the space upon movement of the plunger away from the valve in a fuel intake stroke and for pressurization of the fuel to a level above the delivery valve spring force upon movement of the plunger towards the valve in a pumping stroke, a plurality of fuel outlet lines corresponding in number to the number of engine cylinders connected at one end to the bore downstream of the valve and connected at their other ends each to a separate engine cylinder, each of the outlet lines containing a fuel outlet valve normally closed to block fuel flow to the cylinders, each of the outlet valves having a solenoid connected thereto for moving the outlet valve to an open position upon energization of its solenoid, the solenoids being selectively energized one at a time to assure the injection of fuel into each cylinder on a one at a time schedule, force means to reciprocate the plunger, and stroke control means to variably control the stroke of the plunger to vary the duration and magnitude of injection of fuel to each of the outlet lines, the force means comprising a source of high pressure fluid selectively connectable to the plunger for moving the same, the control means including electrical means to apply and vent the fluid to and from the plunger and to control the duration and magnitude of the fluid force level to control the pumping stroke of the plunger.

3. A pump as in claim 1, the outlet valve solenoids being coaxially mounted with respect to the plunger axis to surround the same and being circumferentially spaced from one another to form a compact pump unit.

4. A pump as in claim 1, including adjustable stop means limiting the intake stroke of the plunger, and feedback position sensor means sensing the position of the plunger and connected to the electrical means for correcting the impulse voltage to the main solenoid to provide fuel pumping in accordance with the predetermined schedule.

5. A pump as in claim 3, the delivery valve comprising a retraction type valve retracting a predetermined volume of fuel from the activated outlet line during the intake stroke movement of the plunger to reduce the residual pressure in the outlet lines.

6. A pump as in claim 2, including further solenoid controlled valve means connected to the electrical means, the valve being movable to an open position upon energization of the further solenoid to apply the fluid to the plunger and movable to a fluid vent position upon deenergization of the fluid, the electrical means controlling the impulse voltage duration and magnitude to the further solenoid to control the duration and magnitude of fuel pumped by the plunger by controlling the pumping stroke thereof.

7. A pump as in claim 6, wherein the high pressure fluid is engine fuel, and a fuel pump for pressurizing the engine fuel to the high pressure level.

8. A pump as in claim 1, the solenoids and outlet valves consisting of a series of solenoid connected and controlled valves arranged in a circular pattern around the plunger, the outlet valves being operated in sequence in accordance with the firing order of the engine to deliver fuel to the appropriate engine cylinder.

9. A pump as in claim 1, including a fuel distribution chamber between the delivery valve and the outlet lines.

* * * * *